N. B. SIMPSON.
INTERNAL COMBUSTION ENGINE.
APPLICATION FILED AUG. 23, 1912.

1,075,163.

Patented Oct. 7, 1913.

Witnesses
Inventor
N. B. Simpson
Attorneys

UNITED STATES PATENT OFFICE.

NAPOLEON B. SIMPSON, OF FOXBORO, MASSACHUSETTS, ASSIGNOR OF FORTY-NINE ONE-HUNDREDTHS TO MARSHALL T. DAVIDSON, OF BROOKLYN, NEW YORK.

INTERNAL-COMBUSTION ENGINE.

1,075,163.  Specification of Letters Patent.  Patented Oct. 7, 1913.

Application filed August 23, 1912. Serial No. 716,769.

*To all whom it may concern:*

Be it known that I, NAPOLEON B. SIMPSON, a citizen of the United States, and resident of Foxboro, county of Norfolk, State of Massachusetts, have invented a certain new and useful Improvement in Internal-Combustion Engines, of which the following is a specification.

This invention relates to internal combustion engines and more particularly to the construction and arrangement of the valves for controlling the admission and the exhaust of the motive fluid.

One of the objects of the invention is to provide an engine having practically unrestricted inlet and exhaust ports which are controlled by valves adapted to be quickly and fully opened and closed and also adapted to automatically compensate for wear and expansion and contraction.

Another object of the invention is to provide a valve construction in which the valve is always maintained in its central position.

Figure 1:
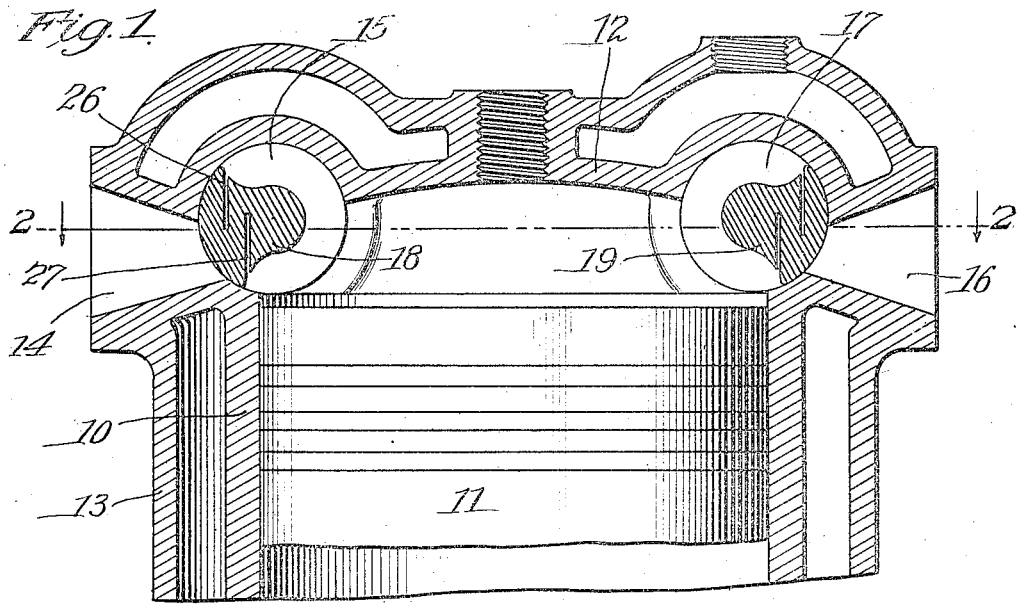
Figure 2:
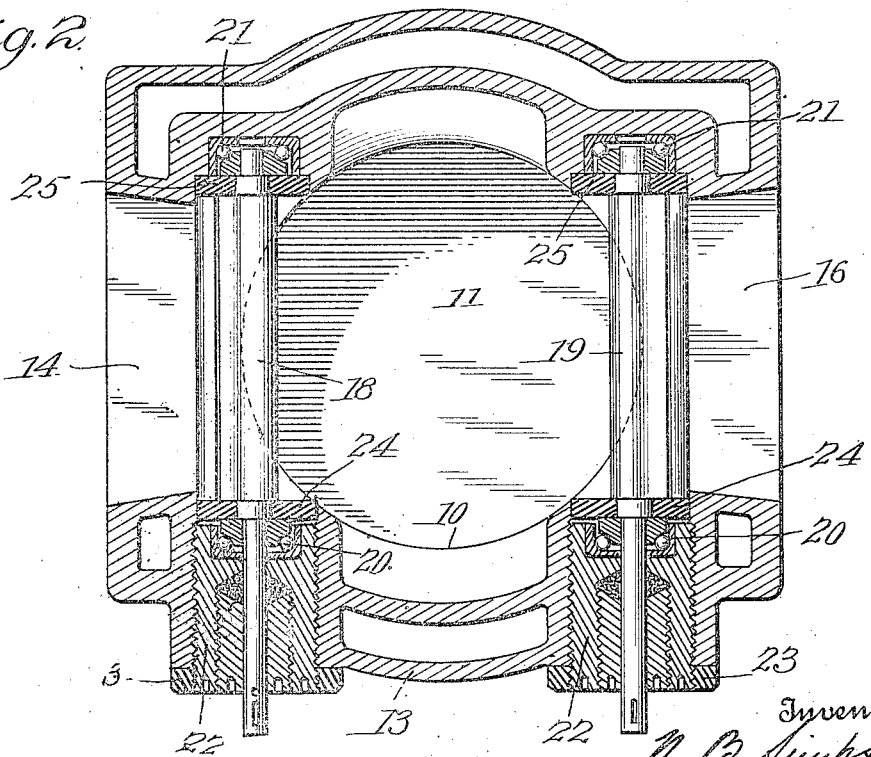

Other objects and the features of novelty will be apparent from the following description, taken in connection with the accompanying drawings, in which, Figure 1 is a longitudinal section through a portion of the cylinder of an internal combustion engine embodying the invention; Fig. 2 is a section on the line 2—2 of Fig. 1 looking in the direction of the arrow.

Referring to the drawings, 10 indicates the cylinder in which is arranged a piston 11. The cylinder is provided with an integral head 12 and a water jacket 13. An inlet port 14 extends through the water jacket and communicates with a cylindrical valve chamber 15 arranged at the end of the cylinder and extending at right angles to the axis thereof. On the opposite side of the cylinder from the port 14 is an exhaust port 16 which communicates with a valve chamber 17. An inlet valve 18 is arranged in the chamber 15 and is adapted to close the port 14, as will be clearly seen from Fig. 1. A similar valve 19 is arranged in the chamber 17 and is adapted to close the port 16. The valves 18 and 19 are preferably in the form of cylindrical segments formed integral with their stems, the latter being supported in ball bearings 20 and 21. The bearing 20 is carried by a threaded sleeve 22 which is screwed into the cylinder casting and locked in position by means of a lock nut 23. The bearing 21 is carried in a suitable recess in the cylinder casting and the inner races of the bearings 20 and 21 are preferably of conical form so that by adjusting the sleeve 22 any wear producing lateral play in the bearings may be taken up and the valve stem maintained in its central position. At the ends of the valves 18 and 19 are arranged lava washers 24 and 25 which are adapted to prevent the gases from getting into the bearings 20 and 21.

In order to provide a valve which is self-adjusting to take up wear either on the surface of the valve or on the seat and also compensate for expansion and contraction, I have provided longitudinally extending slots 26 and 27 which extend from the sides of the cylindrical segments to about the medial line thereof and are preferably in staggered relation as shown. The slots 26 and 27 are cut in the valve after the same has been made and cause the outer portions of the valve to spring against the seat, thus avoiding the use of separate facing and packing strips which have been provided in prior constructions and held against the seat by means of suitable springs.

The construction of the valve as will be readily observed from the drawings permits of the use of ports of large capacity and also avoids the use of springs and other devices for holding the valves against their seats. It will also be observed that the valve chambers are in direct communication with the interior of the cylinder and that by having the valves seat against the outer sides of the valve chambers the pressure of the gases within the cylinder will hold the valves against their seats and thus aid in preventing leakage.

Any suitable mechanism may be provided for oscillating the valves and as this feature of the engine forms no part of the present invention I have omitted a description of the same.

Having described my invention what I claim and desire to secure by Letters Patent is—

1. In an internal combustion engine, a cylinder, a valve chamber communicating with the interior of said cylinder, a port adapted to communicate with said valve chamber, a valve for closing said port and comprising a portion having a surface in the form of a surface of revolution fitting the interior of said chamber, and a stem formed integral with said portion, said portion having slots therein extending in the direction of the axis of said stem as and for the purpose described.

2. In an internal combustion engine, a cylinder, a cylindrical valve chamber communicating with the interior of said cylinder, a port adapted to communicate with said chamber, a valve fitting on the interior of said chamber and adapted to close said port, a stem for said valve, and means for holding said stem against lateral movement, said valve having a slot extending in the direction of the axis of the stem whereby the portion of the valve fitting said chamber is held against the same by the elasticity of the material of which the valve is made.

3. In an internal combustion engine, a cylinder, a cylindrical valve chamber communicating with the interior of said cylinder, a port adapted to communicate with said chamber and a valve for closing said port, said valve having a stem and a seat portion, the latter fitting the wall of said chamber, and slots cut in the seat portion of the valve and extending longitudinally thereof, whereby the seat portions are sprung against the wall of said chamber by the elasticity of the material of which the valve is made.

4. In an internal combustion engine, a valve chamber having a port in communication therewith, and a valve for said port having a seat portion, in the form of a surface of revolution fitting said chamber, said valve having a plurality of slots extending in the direction of the axis thereof and arranged in staggered relation, whereby said seat portion is sprung against the wall of said chamber by the elasticity of the material of which the valve is made.

5. In an internal combustion engine, a valve chamber having a port in communication therewith, and a valve for said port, having a cylindrical seat portion fitting said chamber, and adapted to be rocked on the axis of said seat portion, said valve having slots in its surface on opposite sides of the valve and arranged in staggered relation.

6. In an internal combustion engine, a cylinder, a piston therein, cylindrical valve chambers at one end of said cylinder, each being in communication with the cylinder and having a port in communication therewith, and a valve in each of said chambers comprising a segmental seat portion fitting the chamber and provided with slots extending in the direction of the axis of the valve, said slots being arranged on opposite sides of the valve and in staggered relation.

In testimony whereof I affix my signature in presence of two witnesses.

NAPOLEON B. SIMPSON.

Witnesses:
B. M. KENT,
ARTHUR L. BRYANT.